United States Patent [19]

Reid et al.

[11] Patent Number: 5,319,663
[45] Date of Patent: Jun. 7, 1994

[54] DUST PRECIPITATION IN A GAS LASER

[75] Inventors: John Reid, Stittsville; Steven D. Hastie, Clayton; George S. P. Castle, London, all of Canada

[73] Assignee: Lumonics Inc., Kanata, Canada

[21] Appl. No.: 993,130

[22] Filed: Dec. 18, 1992

[51] Int. Cl.⁵ .............................................. H01S 3/22
[52] U.S. Cl. ..................................... 372/59; 372/55; 372/57; 372/58
[58] Field of Search ..................... 372/55, 57, 58, 59, 372/87

[56] References Cited

U.S. PATENT DOCUMENTS

| | | | |
|---|---|---|---|
| 3,633,337 | 1/1972 | Walker | 55/4 |
| 4,031,484 | 6/1977 | Frieberg et al. | 372/59 |
| 4,316,157 | 2/1982 | Dosi et al. | 372/59 |
| 4,534,034 | 8/1985 | Hohla et al. | 372/59 |
| 4,550,408 | 10/1985 | Karning et al. | 372/58 |
| 4,611,327 | 9/1986 | Clark et al. | 372/58 |
| 4,695,358 | 9/1987 | Mizuno et al. | 204/174 |
| 4,718,072 | 1/1988 | Marchetti et al. | 372/55 X |
| 5,048,041 | 9/1991 | Akins et al. | 372/57 |
| 5,200,970 | 4/1993 | Klopotek | 372/55 |

FOREIGN PATENT DOCUMENTS 2-240978  12/1990  Japan ................................ 372/59

OTHER PUBLICATIONS

Harry White, "Industrial Electrostatic Precipitation", Addison Welsey, pp. 159-165 (1963).

Primary Examiner—Rodney B. Bovernick
Assistant Examiner—Hemang Sanghavi

[57] ABSTRACT

Dust in a gas laser, particularly an excimer laser, is removed from the gas charge by one or more electrostatic precipitators that are located inside the laser vessel in the path of gas circulation that is produced by a fan and passes through the discharge area defined by the main discharge electrodes. The gas is caused to travel rapidly past the precipitator so that only a minor proportion of the dust is removed at each pass, but a low background level of dust in the gas is soon achieved and maintained by repeated such passes. This technique of employing multiple passes, each removing only a small percentage of the dust in the gas at any given time, can also be applied to a system in which the precipitator is located outside the vessel and is connected thereto by conduits.

9 Claims, 2 Drawing Sheets

DUST PRECIPITATION IN A GAS LASER

FIELD OF THE INVENTION

The present invention relates to the cleaning of the gas charge in a gaseous laser by the removal of dust therefrom, using an electrostatic precipitator for this purpose.

BACKGROUND OF THE INVENTION

When a gas laser operates, the electrical discharges between the main electrodes and from any preionization pins that may also be employed cause the erosion of very fine particles of metal from these electrodes and/or pins. The dust that results consists of these particles of metal or of compounds that the metal may have formed with a gas in the laser vessel. In many lasers the gaseous charge is actually a mixture of different gases. However, for the present purposes the charge in the laser vessel, whether a single gas or a mixture of gases, will be referred to simply as "the lasing gas" or just "the gas". If too much of this dust is allowed to accumulate and to circulate in the gas, it can impair the efficiency of the laser operation. It also has a tendency to collect on the optics (mirrors, or windows if external mirrors are used) at each end of the laser cavity, which reduces the performance of these optics.

While this dust problem may be present to some degree in any gas laser, it is particularly acute in an excimer laser. For this reason, although the present invention is applicable to use in any gas laser that experiences the generation of an unacceptable level of dust, it is of primary importance when used with an excimer laser, and hence the examples given below will relate to such latter use.

PRIOR ART

This dust problem has been recognized for some time. For example, in U.S. Pat. No. 4,534,034 issued Aug. 6, 1985 to K. Hohla et al. there is disclosed a system in which a portion of the gas in an excimer laser is slowly withdrawn from the laser vessel by a pump and is passed through an electrostatic precipitator located outside the laser vessel, in which precipitator the entrained dust particles are removed. After subsequently passing through a quiescent zone, the cleaned gas is returned to the laser vessel in the vicinity of the "windows", at the two ends of the lasing cavity, in order to "wash" such windows, i.e. to keep them substantially free of dust.

U.S Pat. No. 5,048,041 issued Sept. 10, 1991 to R.P. Akins et al. discloses another dust removal system for an excimer laser in the form of an electrostatic precipitator 56 (FIGS. 1 and 5) also mounted outside the laser vessel. A small proportion of the gas discharged from the main circulating fan 46 in the laser vessel is deflected by a scoop 54 and fed to the precipitator. After removal of the dust, this small portion of the ga is returned to the laser vessel and is directed towards the optics along a passageway 112 (FIG. 8).

Electrostatic precipitators per se have been known for many years. See, for example, the textbook "Industrial Electrostatic Precipitation" by Harry J. White published in 1963 by Addison Wesley. A typical electrostatic precipitator performs essentially two functions. Firstly, a corona discharge imparts an electric charge to each dust particle, and then these charged particles are subjected to an electric field so that they tend to be deflected to and collect on one of the electrodes forming such field. In many instances, these particle charging and particle deflecting functions are carried out simultaneously in a single device. For example, the wires 86 shown in FIG. 5 of the Akins et al. patent are charged to a high voltage and cooperate with the walls of the tubular members 82 along which they extend both to form a corona discharge to charge the dust particles and to set up the field that deposits such particles on the members 82 as shown at 100 in FIG. 4.

A theoretical explanation of particle collection by this method is provided by the White textbook referred to above, with particular reference to pages 159–165. The conclusion reached is that the relative change of N, i.e. $\Delta N/N$, where N is the number of dust particles per cubic centimetre at a point of interest along a precipitating electric field of length L, is proportional to $\Delta l$ (the incremental distance moved along the precipitator) and is inversely proportional to $v$, where $v$ is the velocity of the particle along the precipitator. This relationship is given in the White textbook, page 165, equation 6.10, the other factors in this equation being constants depending on the geometry and dimensions of the precipitator. As also explained in the unnumbered equation in the sixth line of page 165

$$\Delta l = v \Delta t$$

where $\Delta t$ is the time interval for the gas to move the distance $\Delta l$. Applying this latter equation to the relationship that $$\Delta N/N \propto \Delta l/v$$

yield the result that $$\Delta N/\Delta t \propto N$$

Hence the time rate of change of the number of particles in the gas is proportional to the number of particles remaining at any given time. This merely confirms the common sense expectation that, if the gas enters the precipitator relatively dirty, i.e. with a relatively large number of dust particles per cubic centimetre, the rate of reduction with time of the number of particles will be relatively high, i.e a relatively large number of particles will be collected on the electrode per unit time. On the other hand, by the time the gas reaches the exit end of the precipitator, the rate of collection of dust will be greatly diminished, since it has by now been subjected to a substantial degree of cleaning in the upstream part of the precipitator. If the overall performance of the precipitator is illustrated graphically it takes the form of an exponential curve that shows an initial high rate of particle collection at the entry end of the precipitator, this rate initially decreasing rapidly and finally becoming relatively flat to illustrate a low rate of particle collection at the end of the precipitation process. This situation was understood by Akins et al. as evidenced by their FIG. 6 and the description thereof in column 7 lines 32–61. Curves A–E of this figure assume laminar flow of the gas, but in practice such laminar flow is extremely difficult to achieve. Note the comment in the White textbook, at the middle of page 160, where it is stated that "laminar flow never occurs under practical conditions in industrial precipitators." Compare White's FIG. 6.1 on page 160, and his mathematical relationships assuming streamline flow, with his FIG. 6.3 on page 163 which illustrates the practical turbulent conditions and provides the basis for the mathematics on pages 164 and 165. Akins et al. recognized the possibility of turbulent flow by curve F of FIG. 6, and it is this type of exponential curve that is believed to represent the true practical situation that needs to be taken into account when designing an electrostatic precipitator for use with a gas laser. Such an exponential curve of particle collection with time and hence with distance along the length of the precipitator from its entry end to its exit end, demonstrates that the precipitator has an effectiveness that is initially high but falls off markedly towards its exit end. It also means that, if the gas is to emerge acceptably clean, say with about 90% or more of the dust removed (as is necessary if it is to effectively wash the optics and not contribute further to their contamination), there is a need for a lengthy dwell time in the precipitator. This requires either a long precipitator or a relatively slow flow rate of the gas through the precipitator, or both.

Before moving on to explain the present invention, it will be useful to point out that both the Hohla et al. and Akins et al. systems adopt this slow flow rate approach. At any one time they extract only a small portion of the gas from the vessel and pass this extracted portion slowly lengthwise through an elongate electrostatic precipitator in order to clean it thoroughly. They then return this thoroughly cleaned gas to the vessel at locations such that it washes the optics.

SUMMARY OF THE INVENTION

In accordance with one aspect of the present invention, this conventional wisdom of thoroughly and hence slowly cleaning the gas a small portion at a time so that it can be returned to the vessel in a highly clean condition to wash the optics, is replaced by an entirely different approach. The new approach is to flow as much of the gas as possible rapidly past an electrostatic precipitation region in a multiplicity of passes. Although such a rapid pass of the gas through the precipitation region may remove only a small proportion, say 10%, of the dust present at that time, it will be followed almost immediately by a second and similar rapid pass that will remove another relatively small percentage of the dust, and so on, until after a number of such passes the system will have reached and will maintain an equilibrium or "background" condition in which as much dust is being removed as is being created by the firing of the laser.

The new approach permits a larger proportion of the gas charge in the laser vessel to be processed at each pass, and in one preferred embodiment of the invention almost the entire gas charge is subjected to the precipitation process at each pass.

To take a somewhat simplistic example, i.e. one not necessarily numerical exact, it is more effective with this new fast flow technique to remove 10% of the dust from a large proportion of the gas charge in a short time and to constantly repeat this process, than to try, as the prior methods do, to remove say 90% or more of the dust from a small portion of the gas at each pass. Just as many passes are eventually needed in the slow technique in order to process the entire gas charge, and each pass takes longer. As demonstrated above, the rate of removal of dust, $\Delta N/\Delta t$, is proportional to N, but it is independent of the flow rate $v$. The fast, multiple pass, flow technique is thus equivalent to operating repeatedly on only the initial steep portion of the exponential dust removal curve (which is by far the most effective portion of the curve), without having to accept the disadvantage of ever operating on the much less effective flatter portion of the curve.

Thus, in one aspect, the invention can be defined as a method of removing dust from the charge of lasing gas in the sealed vessel of a gas laser, such method comprising continuously and repeatedly passing the gas rapidly through an electrostatic precipitator to remove a minor proportion of the dust from the gas during each pass through the precipitator, while achieving and maintaining a low background level of dust in the gas by the repeated nature of such passes. This method is applicable to an arrangement in which the precipitator is mounted either inside or outside the vessel.

If the precipitator is mounted inside the laser vessel, the inventive method can be said to comprise continuously and rapidly circulating the gas within the vessel so that it passes (in either sequence) through the lasing discharge area defined by the main electrodes and through the electrostatic precipitator.

The invention also includes apparatus for carrying out such methods.

Additional and more specific features and advantages of the preferred embodiments of the invention will become apparent from the specific description below.

BRIEF DESCRIPTION OF THE DRAWINGS

FIG. I is a simple transverse section, i.e. without parts beyond the section line being seen in elevation, on an excimer laser constructed in accordance with a preferred embodiment of the invention, this section being taken on the line I—I in FIG. II;

FIG. II is a section on the line II—II in FIG. I;

Figure 1:
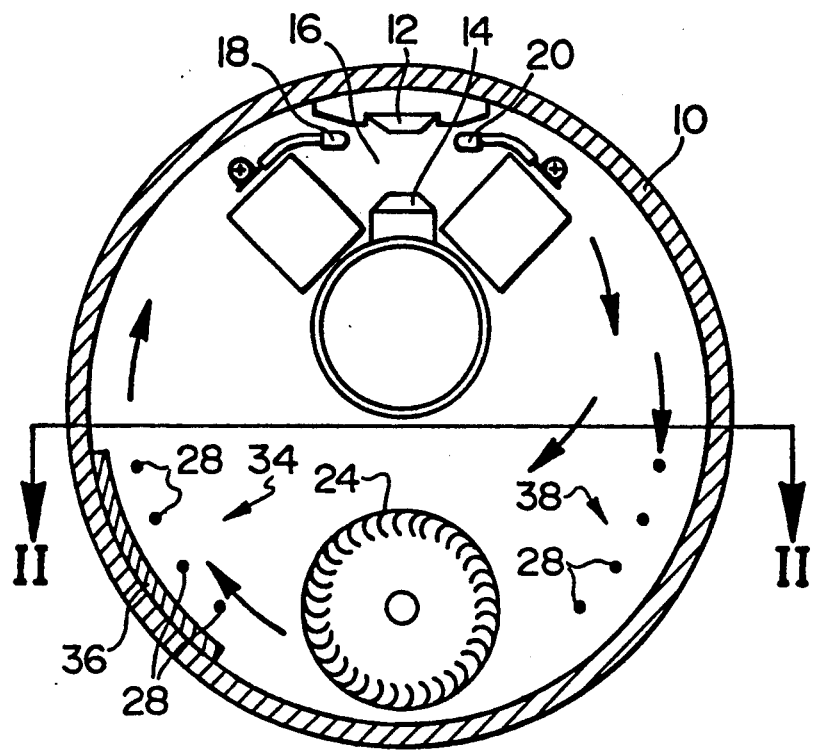
Figure 2:
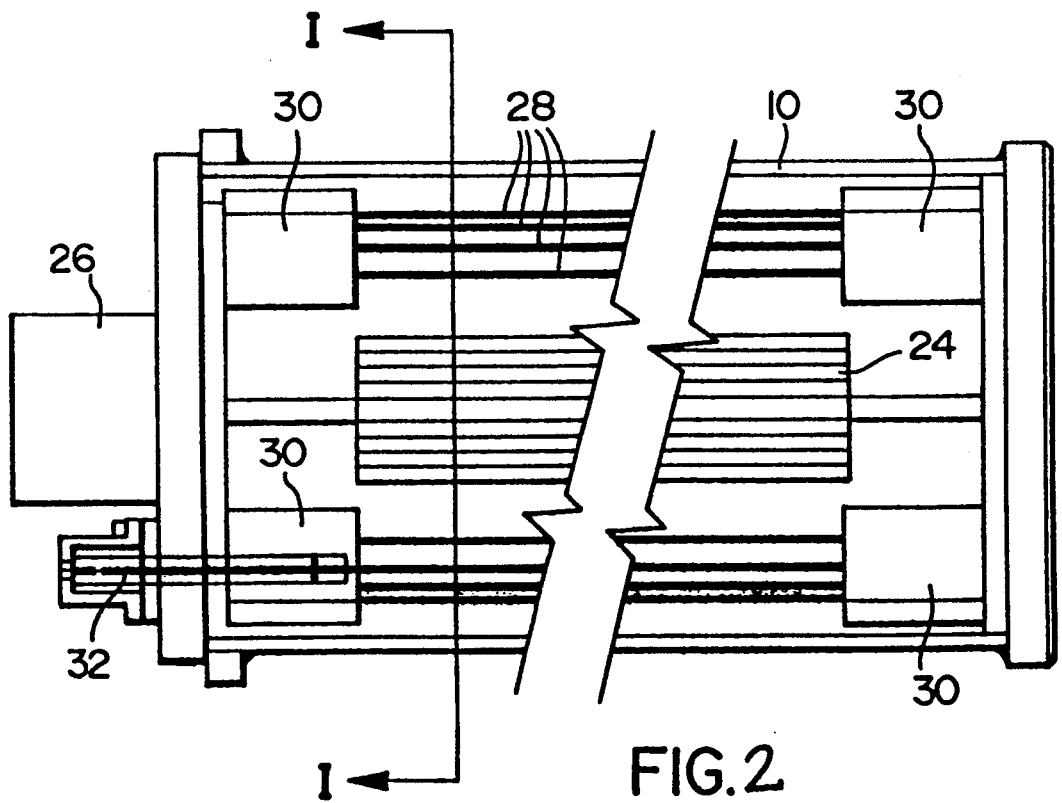
Figure 3:
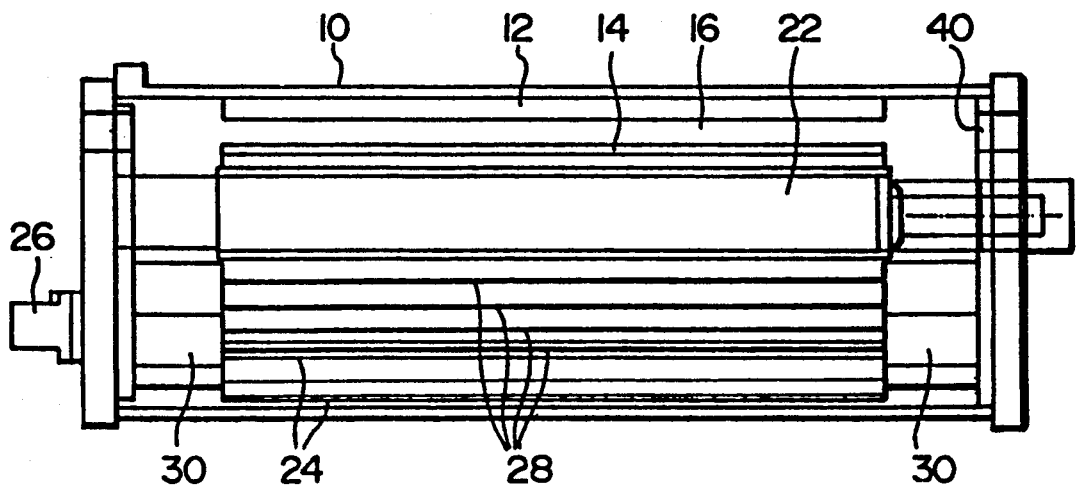
Figure 4:
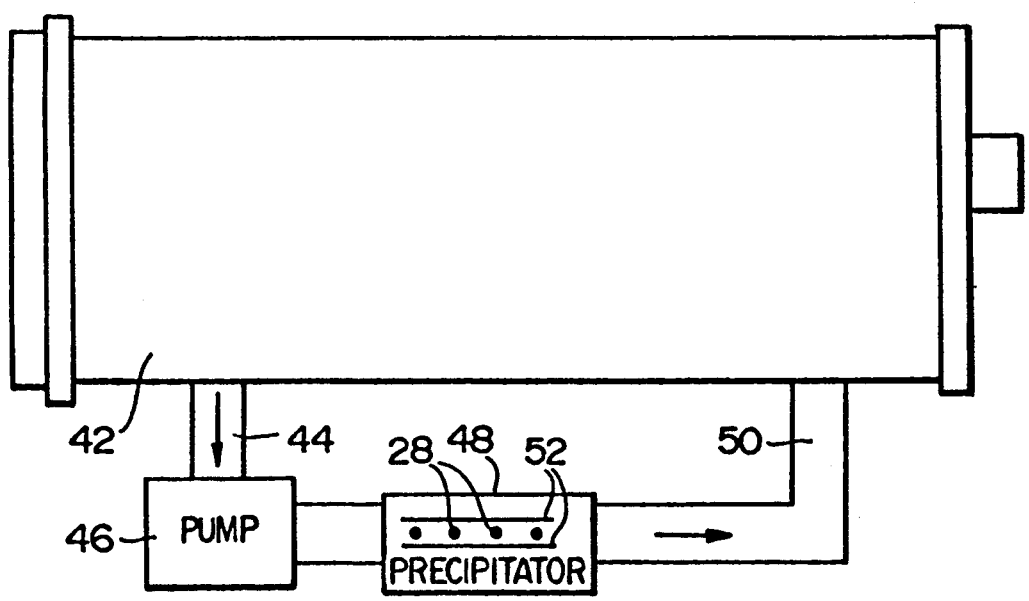

FIG. III is a side view of the same laser with the side wall removed; and

FIG. IV is a diagrammatic illustration of an alternative embodiment.

DETAILED DESCRIPTION OF THE EMBODIMENTS

Throughout the drawings many of the elements that are conventional in an excimer laser, but which are not germane to the present invention, have been omitted for simplicity and clarity.

While, as explained below in connection with FIG. IV, the scope of the invention includes a construction in which a precipitator is located external to the laser vessel, a valuable advantage of the present invention is that it facilitates the placing of the precipitator elements inside such vessel.

FIGS. I to III show a cylindrical, metal, laser vessel 10 which is sealed and contains a gas charge at a superatmospheric pressure. The interior frame of the laser, which is designed to be introduced into the vessel 10 from one end thereof and then appropriately sealed, supports main electrodes 12 and 14 defining a discharge area 16, and preionization pins 18, 20. The power supplies to these electrodes and pins, including the capacitors attached to the pins, are not shown in detail, since these parts are conventional. Also conventional is gas circulating means in the form of an elongate fan 24 powered by a motor 26 for circulating the gas around the inner periphery of the vessel 10 in paths shown by the arrows in FIG. I. In the case of a laser vessel that is not cylindrical, deflectors or flow guides (not shown) can be used to ensure appropriate direction of the gas that emerges substantially radially from the fan, so that it reaches the discharge area 16 and eventually returns to the intake side of the fan. As appears from FIG. III, the fan 24 extends for the full length of the electrodes 12, 14 and almost the full length of the vessel 10. As a result, the fan continuously circulates a major portion of the gas charge in a uniform fashion along the full length of the fan.

The novel feature of this embodiment of the present invention is the provision of a plurality of electrically conductive, elongate elements 28. These can be thin wires or preferably threaded rods. They extend along the vessel parallel to the fan 24 and are arranged in the direct path of the outflow of gas from the fan. These elements 28 are supported at their ends by insulating mounts 30 that are secured to the interior frame of the laser. The elements 28 are electrically interconnected by wires (not shown) and are supplied with an appropriate voltage through a feedthrough 32. The vessel 10 is grounded. The voltage applied to the elements 28, plus their own nature (small surface radius or surface threads) and their locations relative to each other and to the vessel wall, are so chosen that the necessary corona discharges take place between such elements and the vessel wall. This assembly of elongate elements 28 and the wall of the vessel 10 thus constitutes an electrostatic precipitator 34.

Instead of the corona discharges extending between the relative elements 28 and the vessel wall, a separate metallic plate or partial sleeve 36 can be so mounted on the interior frame of the laser that it is located inside the vessel wall and acts as the grounded corona and field electrode. The advantage of this latter arrangement is that, when the interior frame is removed from the vessel 10 for maintenance, the plate 36 comes with it for cleaning or replacement, which may be easier than removing accumulated dust from the vessel wall. In a laser vessel that uses deflectors or flow guides, these elements can form the grounded part or parts of the corona and field generating assembly. Also, such grounded plates can be positioned radially inwardly of the elements 28, either instead of or as well as being located radially outwardly like the plate 36.

The drawings show a second, similar electrostatic precipitator 38 on the other side of the vessel, namely in the path of part of the return gas flow into the fan 24. While this dual precipitator arrangement achieves maximum utilization of the space available, it is nevertheless within the scope of the invention to employ only one of the precipitators 34 and 38.

It will be observed that a further advantage of the arrangement so far described resides in the fact that no fan, pump or other circulating means other than the existing fan 24 is required to pass the gas flow over the electrostatic precipitator or precipitators.

Tests conducted with this construction have demonstrated that after a short period of operation it achieves and maintains an acceptably low background dust level that is often lower than the level achievable in the past with the prior art type of construction in which the system strives for a high degree of cleaning of a relatively small proportion of the gas at each pass using a relatively slow flow rate of gas through the precipitator.

It has also been observed that the present fast flow rate technique results in more stable corona discharges, i.e. less sensitivity of the corona discharges to variations in voltage or current, or to the amount of dust. It has been found that under slow flow conditions too much dust can actually quench a corona discharge, or at least seriously impair its effectiveness.

Yet another advantage of the present construction is that it is neither necessary nor desirable to direct any of the cleaned gas directly onto the optics 40. This simplifies the construction of the laser, avoiding any need for the ducting, passageways or the like that have been required in prior constructions to achieve the optic washing effect.

While, as indicated above, there are additional advantages to locating the e ectrostatic precipitating elements inside the laser vessel, there may be some gas laser constructions in which this is either impossible or at least inconvenient, in which case, as shown in FIG. IV, the fast flow technique of the present invention can still be utilized with an external precipitator by continuously withdrawing a relatively large proportion of the gas from a laser vessel 42 through a conduit 44 and propelling it rapidly by a pump 46 through an electrostatic precipitator 48 from whence it is returned to the vessel 42 through a conduit 50 which enters the vessel at one or more locations remote from the optics. The precipitator 48 can be similar to the precipitator 34 in that it may consist of a number of charged corona producing elements 28 (wires or threaded rods) that generate a corona discharge and electric field to one or more grounded plates 52. As in the first embodiment, the flow of gas is transverse to the longitudinal axes of the elements 28, so that the dwell time in the vicinity of any one of such elements is short and the percentage reduction of dust in the gas per pass is again relatively low. However, this relatively low percentage reduction of dust per pass is more than compensated for in the long run by the fast flow technique and its frequent passes of the gas through the precipitator.

We claim:

1. In a gas laser comprising a sealed vessel containing a charge of lasing gas, discharge electrodes defining an elongate lasing discharge area having a first length, a pair of optics spaced beyond respective ends of the discharge area, and an elongate circulating means extending substantially parallel to the discharge electrodes and having a second length substantially equal to said first length for circulating the gas in a closed circulating path in the vessel, said circulating path extending from the circulating means, through the discharge area and back to the circulating means, having a traverse length substantially equal to said second length and being spaced apart from each of the optics; the provision of at least one elongate electrostatic precipitator, each said precipitator being located in said circulating path, extending substantially parallel to the circulating means and having a third length substantially equal to said second length.

2. A laser according to claim 1, wherein said at least one electrostatic precipitator comprises an electrostatic precipitator located in a portion of said circulating path in which the gas flows from the circulating means to the discharge area.

3. A laser according to claim 1, wherein said at least one electrostatic precipitator comprises an electrostatic precipitator located in a portion of said circulating path in which the gas flows from the discharge are to the circulating means.

4. A laser according to claim 3, wherein said at least one electrostatic precipitator comprises an additional electrostatic precipitator located in a portion of said circulating path in which the gas flows from the circulating means to the discharge area.

5. A laser according to claim 1, wherein each of said at least one electrostatic precipitator includes at least one elongate element spaced from a platelike element in the vessel, said elongate element generating a corona discharge to said platelike element upon the application of a voltage across said elements while providing an electrostatic precipitating electric field between said elements, said elongate element extending substantially transverse to the circulation of gas in said path.

6. A laser according to claim 5, wherein the platelike element is part of an inner wall surface of the vessel.

7. A method of removing dust from a charge of lasing gas in a sealed vessel of a gas laser containing discharge electrodes defining an elongate lasing discharge area having a first length, a pair of optics spaced beyond respective ends of the discharge area, and an elongate circulating means extending substantially parallel to the discharge electrodes and having a second length substantially equal to said first length for circulating the gas in a closed circulating path in the vessel, said circulating path extending from the circulating means, through the discharge area and back to the circulating means, having a transverse length substantially equal to said second length and being spaced apart from each of the optics, and at least one elongate electrostatic precipitator, each said precipitator being located in said circulating path, extending substantially parallel to the circulating means and having a third length substantially equal to said second length; the method comprising continuously and repeatedly passing the gas in said circulating path through the discharge area and through said at least one electrostatic precipitator to remove from the gas a minor proportion of the dust in the gas during each pass through said at least one electrostatic precipitator to achieve and maintain a low equilibrium level of dust in the gas by repeated such passes.

8. A method of removing dust from a charge of lasing gas in a sealed vessel of a gas laser having a lasing discharge area in which said dust is generated, and in which vessel a body of said gas is rotated rapidly and repeatedly in a closed circulating path in said vessel to pass through the lasing discharge area; said method comprising removing from the circulating body of gas upon each rotation thereof a minor proportion of the dust therein, by passing the gas through at least one electrostatic precipitator during each said rotation whereby, after a number of such rotations, to produce a dust level that is in equilibrium between new dust created in the discharge area and the dust being removed.

9. A method according to claim 8, wherein said circulating body of gas in the vessel is maintained spaced from optics of the laser.

* * * * *